United States Patent
Lee et al.

(10) Patent No.: US 9,137,781 B2
(45) Date of Patent: Sep. 15, 2015

(54) METHOD OF HANDLING HYBRID AUTOMATIC REPEAT REQUEST RESOURCES IN WIRELESS COMMUNICATION SYSTEM

(71) Applicant: Industrial Technology Research Institute, Hsinchu (TW)

(72) Inventors: Chien-Min Lee, Hsinchu County (TW); Chia-Pang Yen, Hsinchu County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 13/710,387

(22) Filed: Dec. 10, 2012

(65) Prior Publication Data

US 2013/0176930 A1    Jul. 11, 2013

Related U.S. Application Data

(60) Provisional application No. 61/583,614, filed on Jan. 6, 2012, provisional application No. 61/706,790, filed on Sep. 28, 2012.

(51) Int. Cl.
| | |
|---|---|
| *H04L 1/18* | (2006.01) |
| *H04W 72/00* | (2009.01) |
| *H04W 4/06* | (2009.01) |
| *H04L 1/16* | (2006.01) |

(52) U.S. Cl.
CPC ............ *H04W 72/005* (2013.01); *H04L 1/1829* (2013.01); *H04W 4/06* (2013.01); *H04L 1/1607* (2013.01)

(58) Field of Classification Search
USPC ................................................. 370/312, 432
See application file for complete search history.

(56) References Cited

U.S. PATENT DOCUMENTS

| | | | | |
|---|---|---|---|---|
| 8,165,066 B2* | 4/2012 | Tseng | | 370/328 |
| 8,276,035 B1* | 9/2012 | Savarese et al. | | 714/749 |
| 8,681,718 B2* | 3/2014 | Chun et al. | | 370/329 |
| 2006/0251015 A1* | 11/2006 | Khan | | 370/329 |
| 2007/0177569 A1* | 8/2007 | Lundby | | 370/349 |
| 2008/0084825 A1* | 4/2008 | Lee et al. | | 370/236 |
| 2009/0201863 A1 | 8/2009 | Pi | | |
| 2009/0201872 A1* | 8/2009 | Gorokhov et al. | | 370/329 |

(Continued)

FOREIGN PATENT DOCUMENTS

| | | |
|---|---|---|
| CN | 1741631 A | 3/2006 |
| CN | 101137098 A | 3/2008 |

(Continued)

OTHER PUBLICATIONS

Chen, Jiming; Shen, Gang; Jin, Shan; An Adaptive HARQ Algorithm in MIMO Systems.*

(Continued)

*Primary Examiner* — Melvin Marcelo
*Assistant Examiner* — Peter Solinsky
(74) *Attorney, Agent, or Firm* — Winston Hsu; Scott Margo (57) ABSTRACT

A method of handling hybrid automatic repeat request (HARQ) acknowledgement responses in a network of a wireless communication system is disclosed. The method comprises selecting a plurality of communication devices of the wireless communication system when the plurality of communication devices conform to a specified rule; and always responding positive HARQ acknowledgement messages to the plurality of communication devices.

32 Claims, 4 Drawing Sheets

(56) References Cited

U.S. PATENT DOCUMENTS

| | | |
|---|---|---|
| 2009/0207771 A1* | 8/2009 | Lindskog et al. ............ 370/312 |
| 2009/0245187 A1 | 10/2009 | Nam |
| 2010/0031110 A1* | 2/2010 | Seok et al. .................... 714/748 |
| 2010/0040127 A1* | 2/2010 | Wen .............................. 375/232 |
| 2010/0098009 A1 | 4/2010 | Higuchi |
| 2010/0110964 A1* | 5/2010 | Love et al. .................... 370/312 |
| 2010/0165939 A1* | 7/2010 | Lin ................................ 370/329 |
| 2010/0172281 A1* | 7/2010 | Hus et al. ...................... 370/312 |
| 2010/0265898 A1 | 10/2010 | Chun et al. |
| 2010/0296427 A1* | 11/2010 | Lohr et al. .................... 370/312 |
| 2010/0296467 A1* | 11/2010 | Pelletier et al. ............... 370/329 |
| 2011/0032925 A1* | 2/2011 | Lee et al. ....................... 370/345 |
| 2011/0044278 A1* | 2/2011 | Astely et al. .................. 370/329 |
| 2011/0090825 A1* | 4/2011 | Papasakellariou et al. ... 370/280 |
| 2011/0170499 A1 | 7/2011 | Nayeb |
| 2011/0205980 A1* | 8/2011 | Prakash et al. ................ 370/329 |
| 2011/0268032 A1* | 11/2011 | Kim et al. ..................... 370/328 |
| 2012/0320853 A1* | 12/2012 | Kwon et al. ................... 370/329 |
| 2013/0003673 A1 | 1/2013 | Dinan |
| 2013/0039299 A1 | 2/2013 | Papasakellariou |
| 2013/0040578 A1 | 2/2013 | Khoshnevis |
| 2013/0083750 A1 | 4/2013 | Nazar |
| 2013/0148580 A1* | 6/2013 | Han et al. ...................... 370/328 |
| 2013/0235812 A1 | 9/2013 | Heo |
| 2014/0079032 A1* | 3/2014 | Bergstrom et al. ........... 370/336 |
| 2014/0105095 A1* | 4/2014 | Lee et al. ....................... 370/312 |
| 2014/0204854 A1* | 7/2014 | Freda et al. .................... 370/329 |
| 2014/0355539 A1* | 12/2014 | Yang et al. .................... 370/329 |

FOREIGN PATENT DOCUMENTS

| | | |
|---|---|---|
| CN | 101351981 A | 1/2009 |
| CN | 101465720 A | 6/2009 |
| CN | 101480070 A | 7/2009 |
| CN | 101741462 A | 6/2010 |
| CN | 101854720 A | 10/2010 |
| CN | 102017504 A | 4/2011 |
| CN | 102056225 A | 5/2011 |
| WO | 2011076150 A1 | 6/2011 |
| WO | 2011085195 A1 | 7/2011 |

OTHER PUBLICATIONS

Proposal of bit mapping for type-III HARQ, TSG-RAN Working Group 1 Meeting #18, Jan. 15-18, 2001.*

Soundararajan, Srivathsan; Agrawal, Prathima; Li, Yihan; An Efficient HARQ Retransmission Algorithm in OFDMA Based Wireless Networks, Mar. 2009.*

3GPP TS 36.211 version 10.3.0 Release 10, Oct. 2011.*

Pantech, "Discussion on ePHICH to support UL HARQ process", 3GPP TSG RAN Working Group 1 Meeting #66bis R1-113105, Zhuhai, China, Oct. 10-14, 2011, p. 1-3.

Telesystem Innovations, "LTE in a Nutshell: The Physical Layer", White Paper, 2010 Telesystem Innovations Inc., p. 1-18.

3rd Generation Partnership Project, "3GPP TS 36.211 V10.4.0", Technical Specification Group Radio Access Network; Evolved Universal Terrestrial Radio Access (E-UTRA); Physical Channels and Modulation (Rlease 10), http://www.3gpp.org/dynareport/36211.htm, Dec. 22, 2011, coverpage, p. 2-5, 68-73.

* cited by examiner

METHOD OF HANDLING HYBRID AUTOMATIC REPEAT REQUEST RESOURCES IN WIRELESS COMMUNICATION SYSTEM

CROSS REFERENCE TO RELATED APPLICATIONS

This application claims both the benefit of U.S. Provisional Application No. 61/583,614, filed on Jan. 6, 2012, entitled "Method for assigning HARQ-ACK resource and Apparatus using the same", and the benefit of U.S. Provisional Application No. 61/706,790, filed on Sep. 28, 2012, entitled "Method for assigning HARQ-ACK resource and Apparatus using the same", the contents of which are incorporated herein in their entirety.

BACKGROUND OF THE INVENTION

1. Field of the Invention

The application relates to a method utilized in a wireless communication system, and more particularly, to a method of handling resources carrying hybrid automatic repeat request acknowledgement messages in a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In the LTE-A system, since the advanced techniques are supported, such as new carrier type, frequency domain inter cell interference coordination (ICIC), spatial reuse of the resources in coordinated CoMP transmission and downlink MIMO, enhanced physical downlink channels (ePDCCHs) are provided to improve the related abilities. An obvious case is the heterogeneous network scenarios, where the ePDCCHs could be coordinated to avoid interference between macro and low power nodes. In a shared cell scenario, spatial reuse for the same enhanced control channel resource and a downlink transmission on a packet downlink shared channel (PDSCH) within the cell is possible, which provides higher spectrum efficiency. In the CoMP, the uplink transmission will also benefit from the cell splitting gains, which will lead to a problem of collisions between physical indicator channels (PHICH).

Therefore, a method for handling hybrid automatic repeat request acknowledgement responses is necessary for increasing the rate of uplink transmissions, reducing the overhead of acknowledgement transmissions and further increasing the capacity of acknowledgement transmissions.

SUMMARY OF THE INVENTION

The present invention therefore provides a method for handling hybrid automatic repeat request acknowledgement responses in a wireless communication system, to improve the capacity of acknowledgement transmission.

A method of handling hybrid automatic repeat request (HARQ) acknowledgement responses in a network of a wireless communication system is disclosed. The method comprises selecting a plurality of communication devices of the wireless communication system when the plurality of communication devices conform to a specified rule; and always responding positive HARQ acknowledgement messages to the plurality of communication devices.

A method of handling a hybrid automatic repeat request (HARQ) acknowledgement response for a network of a wireless communication system is disclosed. The method comprises selecting a plurality of uplink transmissions from at least one communication device to the network in the wireless communication system when the plurality of uplink transmissions conform to a specified rule; deciding a HARQ acknowledgement response by a specified algorithm; and responding HARQ acknowledgement messages carrying the HARQ acknowledgement response to the at least one communication device.

A communication apparatus for a wireless communication system is disclosed. The communication apparatus comprises a processing means; a storage unit; and a program code, stored in the storage unit, wherein the program code instructs the processing unit to execute the following steps: selecting a plurality of communication devices of the wireless communication system when the plurality of communication devices conform to a specified rule; and always responding positive HARQ acknowledgement messages to the plurality of communication devices.

A communication apparatus for a wireless communication system is disclosed. The communication apparatus comprises a processing means; a storage unit; and a program code, stored in the storage unit, wherein the program code instructs the processing unit to execute the following steps: selecting a plurality of uplink transmissions from at least one communication device to the network in the wireless communication system when the plurality of uplink transmissions conform to a specified rule; deciding a HARQ acknowledgement response by a specified algorithm; and responding HARQ acknowledgement messages carrying the HARQ acknowledgement response to the at least one communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
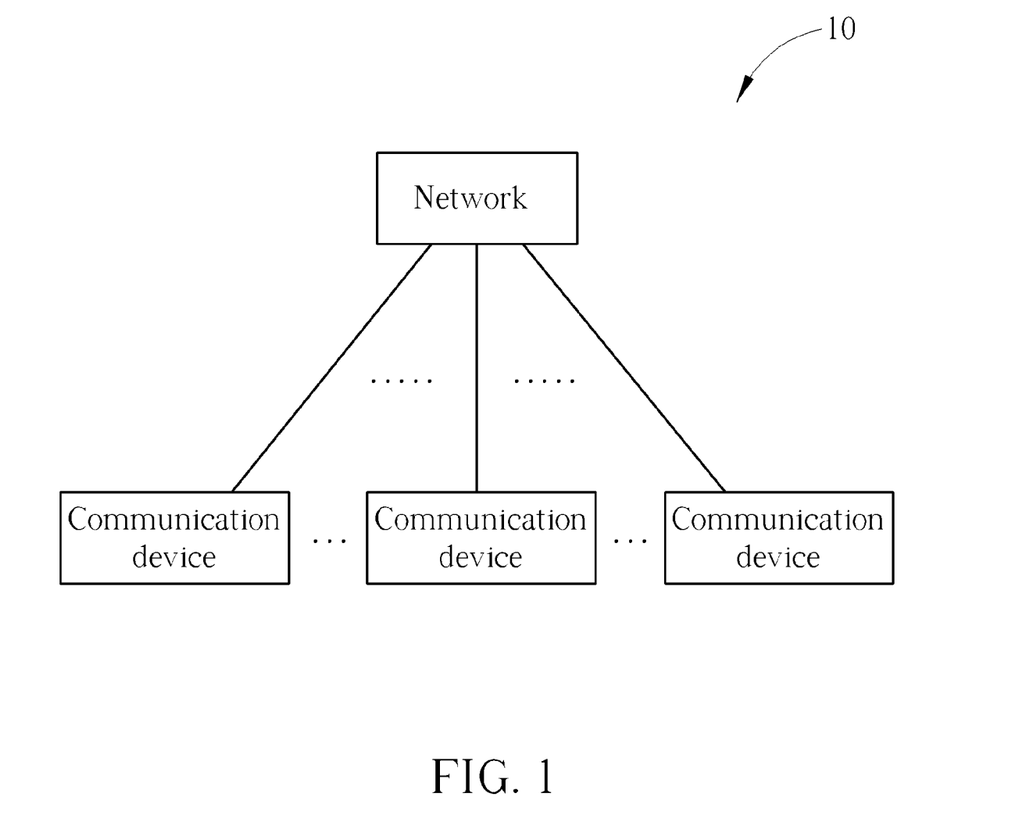
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be mobile communication devices such as user equipments for performing speech and data communication through the network such as the UMTS, the LTE system or the LTE-A system. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver. Alternatively, the communication devices can be machine-type communication (MTC) devices for performing MTC with the network.

Figure 2:
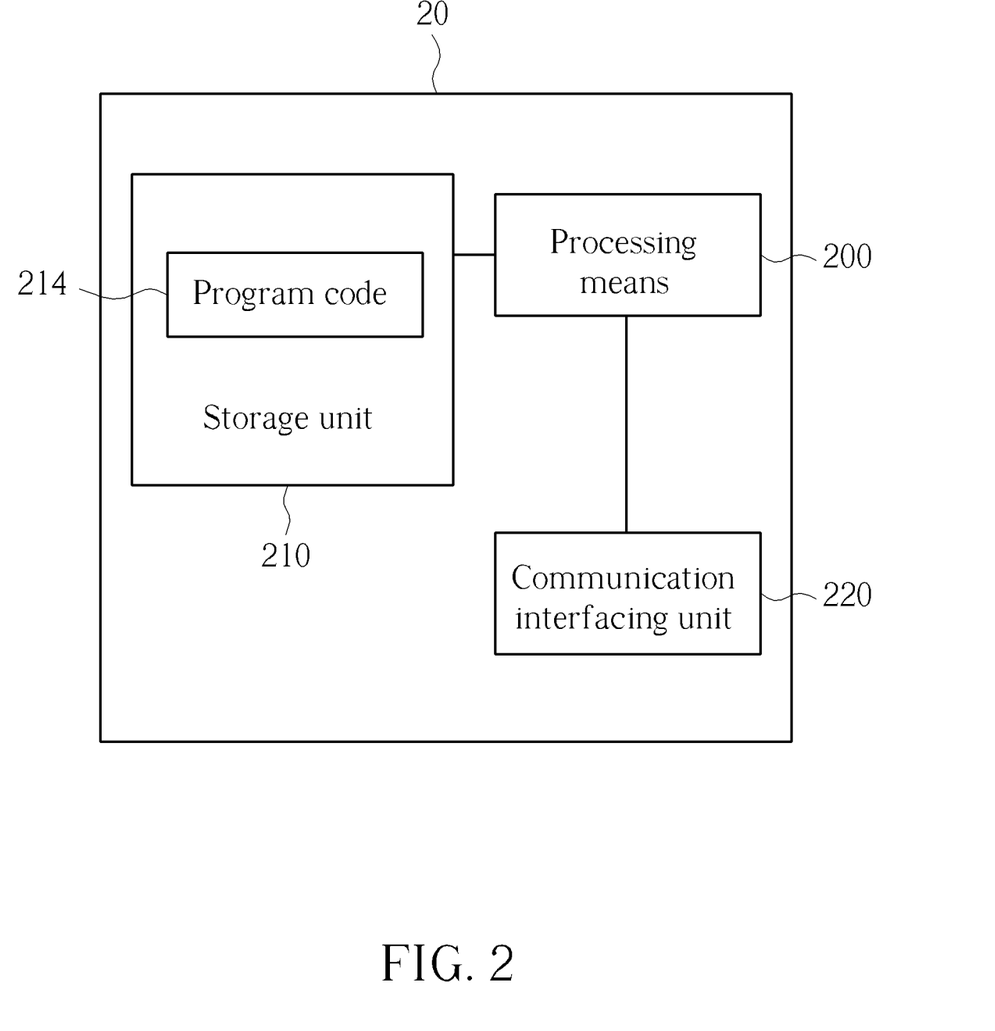
FIG. 2 is a schematic diagram of a communication apparatus according to an example of the present invention.

Please refer to FIG. 2, which is a schematic diagram of a communication apparatus 20 according to an example of the present invention. The communication apparatus 20 can be the network shown in FIG. 1, such as an eNB, but is not limited herein. The communication apparatus 20 may include a processing means 200 such as a microprocessor or Application Specific Integrated Circuit (ASIC), a storage unit 210 and a communication interfacing unit 220. The storage unit 210 maybe any data storage device that can store a program code 214, accessed and executed by the processing means 200. Examples of the storage unit 210 include but are not limited to read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
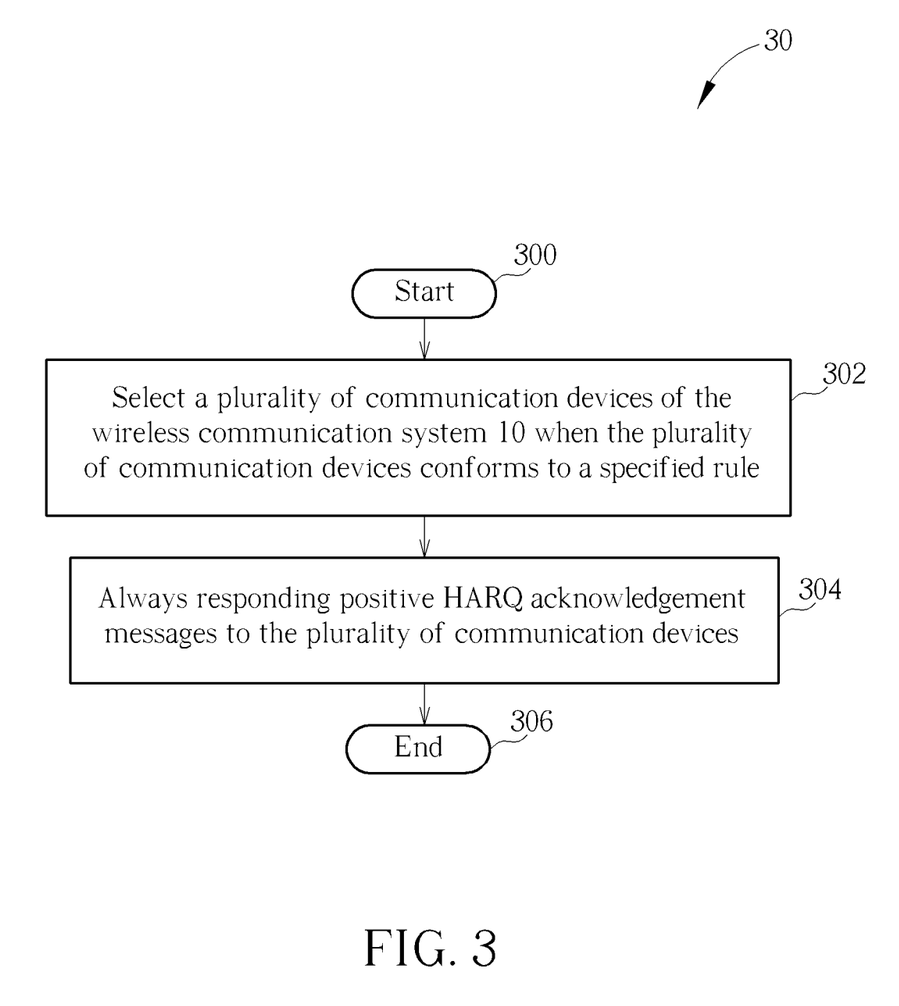
FIG. 3 is a flowchart of a process according to an example of the present invention.

Please refer to FIG. 3, which is a flowchart of a process 30 according to an example of the present invention. The process 30 is utilized in the wireless communication system 10 shown in FIG. 1, for handling hybrid automatic repeat request (HARQ) acknowledgement responses in the network. The HARQ acknowledgement responses represent positive or negative HARQ acknowledgement responses, which should be well-known in this art. The process 30 can be implemented in the communication apparatus 20 and may be compiled into the program code 214. The process 30 includes the following steps:

Step 300: Start.

Step 302: Select a plurality of communication devices of the wireless communication system 10 when the plurality of communication devices conform to a specified rule.

Step 304: Always responding positive HARQ acknowledgement messages to the plurality of communication devices.

Step 306: End.

According to the process 30, the network selects a plurality of communication devices conforming to a specified rule and always responds positive HARQ acknowledgement messages to the plurality of communication devices. Therefore, the plurality of communication devices can not be triggered to retransmit uplink data temporarily due to the positive HARQ acknowledgement messages, such that the overhead of acknowledgement transmissions can be saved.

In detail, in step 302, the specified rule utilized for selecting the plurality of communication devices of the wireless communication system is determined according to buffer status reports, data radio bearers and pre-defined probabilities of the plurality of communication devices. In step 304, the network always responds the positive HARQ acknowledgement messages to the plurality of communication devices. Since the HARQ acknowledgement messages are transmitted via physical indicator channels (PHICHs), which should be well-known in this art, the network has to decide resources for the PHICHs to always carry the positive HARQ acknowledgement messages in response to the plurality of communication devices. A resource for the PHICHs to always carry a positive HARQ acknowledgement message to one of the plurality of communication devices may be decided by a location of a first resource block and cyclic shifts of demodulation reference signals corresponding to an uplink transmission from the one of the plurality of communication devices to the network. The first resource block denotes a lowest resource block index in the uplink transmission. In addition, an amount of the resources of the PHICHs to always carry the positive HARQ acknowledgement messages can be dynamically decided by the network. For example, the amount of the resources for the plurality of physical indicator channels to always carry the positive HARQ acknowledgement messages in response to the plurality of communication devices can be reduced to one or more than one via the setting of first resource blocks and cyclic shifts of demodulation reference signals corresponding to a plurality of uplink transmissions, so that the overhead of acknowledgement transmissions is sufficiently reduced.

In brief, the network of the present invention selects the plurality of communication devices and always responds positive HARQ acknowledgement messages to the plurality of communication devices via the PHICHs, so that the plurality of communication devices are not triggered to retransmit previous uplink data. Besides, the amount of the resources for the plurality of physical indicator channels to always carry positive HARQ acknowledgement messages in response to the plurality of communication devices can be reduced via the setting of first resource blocks and cyclic shifts of demodulation reference signals corresponding to a plurality of uplink transmissions. Therefore, the overhead of acknowledgement transmissions is reduced.

Note that, the process 30 is an example of the present invention. Those skilled in the art should readily make combinations, modifications and/or alterations on the abovementioned description and examples. For example, the uplink transmission may be granted by downlink control information (DCI) which is allocated in control channels such as physical downlink control channels (PDCCHs) or enhanced physical downlink control channels (ePDCCHs). Besides, the specified rule can further include other criterions, such as acknowledgement mode, delay tolerance, reliability, real-time service and so on. Moreover, the location to always transmit the positive HARQ acknowledgement messages can be decided by other parameters or even fixed in a specific location, but is not limited herein. In other words, when the specified rule or the parameters corresponding to the uplink transmission are changed, the network is able to change the resources determined to always carry the positive HARQ acknowledgement messages and to change the plurality of communication devices which are selected to always receive the positive HARQ acknowledgement messages.

Figure 4:
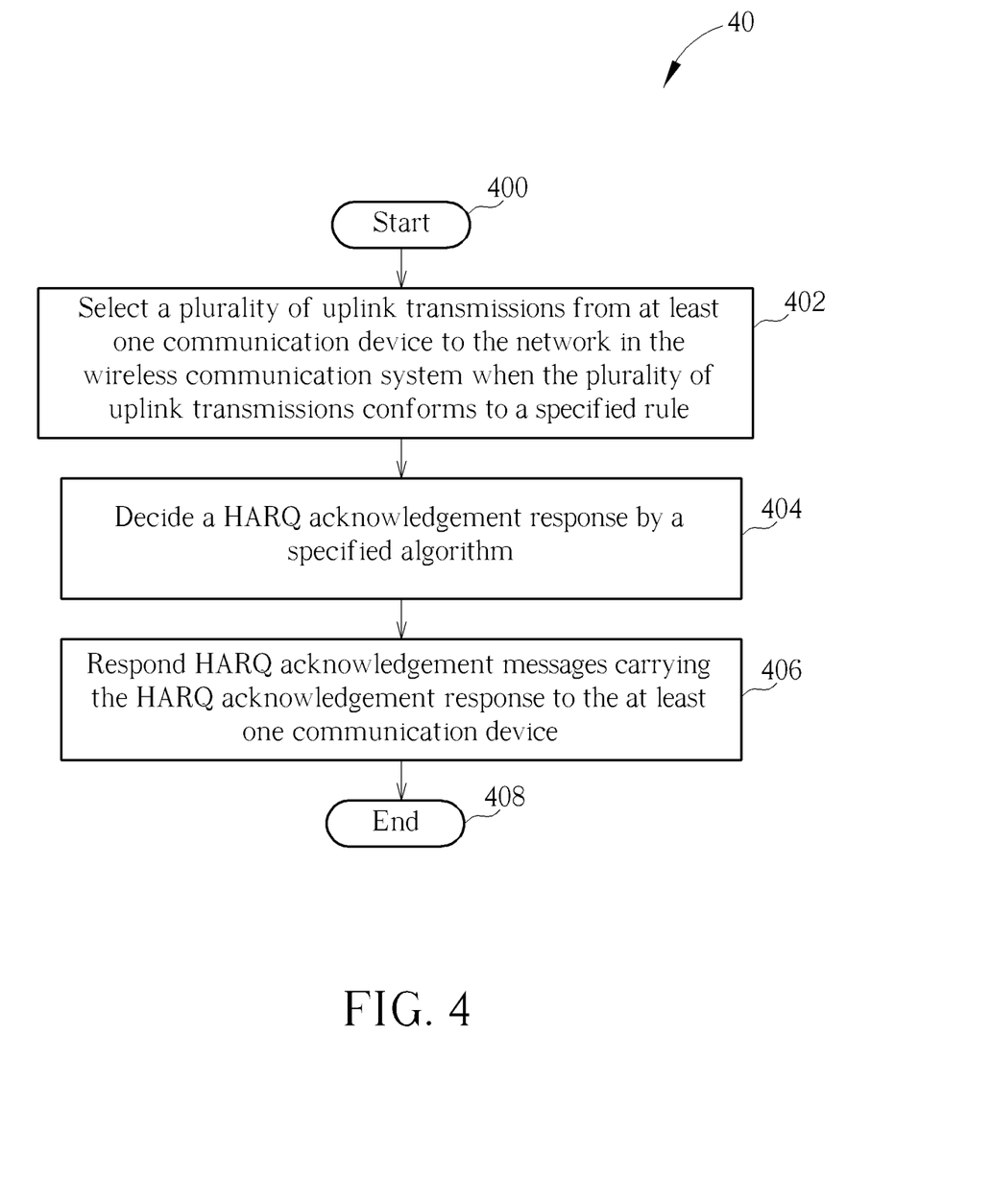
FIG. 4 is a flowchart of a process according to an example of the present invention.

Please refer to FIG. 4, which is a flowchart of a process 40 according to an example of the present invention. The process 40 is utilized in the wireless communication system 10 shown in FIG. 1, for handling hybrid automatic repeat request (HARQ) acknowledgement responses in the network. The HARQ acknowledgement responses represent positive or negative HARQ acknowledgement responses, which should be well-known in this art. The process 40 can be implemented in the communication apparatus 20 and may be compiled into the program code 214. The process 40 includes the following steps:

Step 400: Start.

Step 402: Select a plurality of uplink transmissions from at least one communication device to the network in the wireless communication system when the plurality of uplink transmissions conforms to a specified rule.

Step 404: Decide a HARQ acknowledgement response by a specified algorithm.

Step 406: Respond HARQ acknowledgement messages carrying the HARQ acknowledgement response to the at least one communication device.

Step 408: End.

According to the process 40, the network selects a plurality of uplink transmissions conforming to a specified rule and responds HARQ acknowledgement messages carrying a HARQ acknowledgement response to at least one communication device in the wireless communication system. Since the HARQ acknowledgement messages carry the same HARQ acknowledgement response, an amount of the resources to carry the HARQ acknowledgement messages can be decided by the network and reduced to one or more than one, such that the overhead of acknowledgement transmissions can be saved.

The concept of the process 40 is extended from that of the process 30. In detail, the selecting method in the process 40 is utilized for selecting the plurality of uplink transmissions from the at least one communication device to the network. Besides, the HARQ acknowledgement response in the process 40 can be determined to be positive or negative instead of being always positive in the process 30.

In brief, the network of the present invention selects the plurality of uplink transmissions and responds the HARQ acknowledgement messages carrying the same HARQ acknowledgement response to the at least one communication device via the PHICHs, such that the amount of the resources for the plurality of physical indicator channels to carry the HARQ acknowledgement messages in response to the at least communication device can be reduced via the setting of first resource blocks and cyclic shifts of demodulation reference signals corresponding to the plurality of uplink transmissions. Therefore, the overhead of acknowledgement transmissions is reduced.

Note that, the process 40 is an example of the present invention. Those skilled in the art should readily make combinations, modifications and/or alterations on the abovementioned description and examples . For example, the specified rule can be changed to include identities, geographical locations, pre-defined probabilities of the plurality of communication devices. Besides, the specified algorithm can be a logical AND operation (i.e. as long as one of HARQ acknowledgement responses corresponding to the plurality of uplink transmissions is negative, the HARQ acknowledgement response is chosen to be negative), or a counting and comparing operation (i.e. if a total number of the positive HARQ acknowledgement responses corresponding to the plurality of uplink transmissions is equal or larger than a total number of the negative HARQ acknowledgement responses corresponding to the plurality of uplink transmissions, the HARQ acknowledgement response is chosen to be positive; otherwise, the HARQ acknowledgement response is chosen to be negative), and so on.

In the present invention, the network affording a large loading of HARQ acknowledgement messages selects the plurality of uplink transmissions or communication devices and transmits the HARQ acknowledgement messages carrying the same HARQ response, so that the amount of the resources to carry the HARQ acknowledgement messages can be reduced. Therefore, the overhead of acknowledgement transmissions can be reduced and the capacity of acknowledgement transmissions can be further increased.

To sum up, the present invention provides a method for handling the HARQ acknowledgement responses via a reduction of resources for acknowledgement transmissions, to reduce the overhead of acknowledgement transmissions and further increase the capacity of acknowledgement transmissions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a hybrid automatic repeat request (HARQ) acknowledgement response for a network of a wireless communication system, the method comprising:

the network selecting a plurality of first communication devices from a plurality of communication devices of the wireless communication system when the plurality of first communication devices conform to a specified rule; and the network always responding to the plurality of first communication devices with positive HARQ acknowledgement messages.

2. The method of claim 1, wherein the specified rule is determined according to buffer status reports, data radio bearers, pre-defined probabilities or their combinations for the plurality of communication devices.

3. The method of claim 1, wherein the network transmits HARQ acknowledgement messages in response to the plurality of communication devices via a plurality of physical indicator channels.

4. The method of claim 3, wherein a resource for the plurality of physical indicator channels to always carry positive HARQ acknowledgement messages in response to one of the plurality of communication devices are determined by a location of a first resource block and cyclic shifts of demodulation reference signals corresponding to an uplink transmission.

5. The method of claim 4, wherein the first resource block is a lowest resource block index in an uplink transmission.

6. The method of claim 3, wherein an amount of resources for the plurality of physical indicator channels to always carry positive HARQ acknowledgement messages is dynamically decided by the network.

7. The method of claim 6, wherein the amount of resources for the plurality of physical indicator channels to always carry positive HARQ acknowledgement messages is one or more than one.

8. A method of handling a hybrid automatic repeat request (HARQ) acknowledgement response for a network of a wireless communication system, the method comprising:
the network selecting a plurality of first uplink transmissions from a plurality of uplink transmissions transmitted from at least one communication device to the network in the wireless communication system when the plurality of first uplink transmissions conform to a specified rule;
the network deciding a HARQ acknowledgement response by a specified algorithm; and
the network responding to the at least one communication device with HARQ acknowledgement messages carrying the HARQ acknowledgement response.

9. The method of claim 8, wherein the specified rule is determined according to identities, geographical locations, pre-defined probabilities or their combinations for the plurality of communication devices.

10. The method of claim 8, wherein the HARQ acknowledgement response is a positive HARQ acknowledgement response or a negative HARQ acknowledgement response.

11. The method of claim 8, wherein the specified algorithm is a logical AND operation or a counting and comparing operation.

12. The method of claim 8, wherein the network transmits HARQ acknowledgement messages in response to the at least one communication device via a plurality of physical indicator channels.

13. The method of claim 12, wherein a resource for the plurality of physical indicator channels to carry one of the HARQ acknowledgement messages corresponding to one of the plurality of uplink transmissions is determined by a location of a first resource block and cyclic shifts of demodulation reference signals corresponding to the one of the plurality of uplink transmissions.

14. The method of claim 13, wherein the first resource block is a lowest resource block index in the one of the plurality of uplink transmission.

15. The method of claim 12, wherein an amount of resources for the plurality of physical indicator channels to carry the HARQ acknowledgement messages corresponding to the plurality of uplink transmission is dynamically decided by the network.

16. The method of claim 15, wherein the amount of resources for the plurality of physical indicator channels to carry the HARQ acknowledgement messages corresponding to the plurality of uplink transmission is one or more than one.

17. A communication apparatus for a wireless communication system, comprising:
a processing means;
a storage unit; and
a program code, stored in the storage unit, wherein the program code instructs the processing unit to execute the following steps:
selecting a plurality of first communication devices from a plurality of communication devices of the wireless communication system when the plurality of first communication devices conforms to a specified rule; and
always responding to the plurality of first communication devices with positive HARQ acknowledgement messages.

18. The communication apparatus of claim 17, wherein the specified rule is determined according to buffer status reports, data radio bearers, pre-defined probabilities or their combinations for the plurality of communication devices.

19. The communication apparatus of claim 17, wherein HARQ acknowledgement messages are transmitted in response to the plurality of communication devices via a plurality of physical indicator channels.

20. The communication apparatus of claim 19, wherein a resource for the plurality of physical indicator channels to always carry positive HARQ acknowledgement messages in response to one of the plurality of communication devices are determined by a location of a first resource block and cyclic shifts of demodulation reference signals corresponding to an uplink transmission.

21. The communication apparatus of claim 20, wherein the first resource block is a lowest resource block index in an uplink transmission.

22. The communication apparatus of claim 19, wherein an amount of resources for the plurality of physical indicator channels to always carry positive HARQ acknowledgement messages is dynamically decided by the network.

23. The communication apparatus of claim 22, wherein the amount of resources for the plurality of physical indicator channels to always carry positive HARQ acknowledgement messages is one or more than one.

24. A communication apparatus for a wireless communication system, comprising:
a processing means;
a storage unit; and
a program code, stored in the storage unit, wherein the program code instructs the processing unit to execute the following steps:
selecting a plurality of first uplink transmissions from a plurality of uplink transmissions transmitted from at least one communication device to the network in the wireless communication system when the plurality of first uplink transmissions conform to a specified rule;
deciding a HARQ acknowledgement response by a specified algorithm; and
responding to the at least one communication device with HARQ acknowledgement messages carrying the HARQ acknowledgement response.

25. The method of claim 24, wherein the rule is determined according to identities, geographical locations, pre-defined probabilities or their combinations for the plurality of communication devices.

26. The method of claim 24, wherein the HARQ acknowledgement response is a positive HARQ acknowledgement response or a negative HARQ acknowledgement response.

27. The method of claim 24, wherein the specified algorithm is a logical AND operation or a counting and comparing operation.

28. The method of claim 24, wherein HARQ acknowledgement messages are transmitted in response to the at least one communication device via a plurality of physical indicator channels.

29. The method of claim 28, wherein a resource for the plurality of physical indicator channels to carry one of the HARQ acknowledgement messages corresponding to one of the plurality of uplink transmissions is determined by a location of a first resource block and cyclic shifts of demodulation reference signals corresponding to the one of the plurality of uplink transmissions.

30. The method of claim 29, wherein the first resource block is a lowest resource block index in the one of the plurality of uplink transmission.

31. The method of claim 28, wherein an amount of resources for the plurality of physical indicator channels to carry the HARQ acknowledgement messages corresponding to the plurality of uplink transmission is dynamically decided by the network.

32. The method of claim 31, wherein the amount of resources for the plurality of physical indicator channels to carry the HARQ acknowledgement messages corresponding to the plurality of uplink transmission is one or more than one.

* * * * *